(12) United States Patent
Fusco et al.

(10) Patent No.: US 11,034,214 B2
(45) Date of Patent: Jun. 15, 2021

(54) INTEGRATED DISPLAY AND VENTILATION ASSEMBLY

(71) Applicant: FORD GLOBAL TECHNOLOGIES, LLC, Dearborn, MI (US)

(72) Inventors: Frank Fusco, Plymouth, MI (US); Manfred Koberstein, Troy, MI (US); Jennifer A. Herr-Rathke, Plymouth, MI (US); Alan Gutowski, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 793 days.

(21) Appl. No.: 15/724,658

(22) Filed: Oct. 4, 2017

(65) Prior Publication Data

US 2019/0100078 A1 Apr. 4, 2019

(51) Int. Cl.
*B60H 1/24* (2006.01)
*B60H 1/34* (2006.01)
*B60K 37/04* (2006.01)
*B60K 35/00* (2006.01)

(52) U.S. Cl.
CPC ............... *B60H 1/242* (2013.01); *B60H 1/34* (2013.01); *B60H 1/3414* (2013.01); *B60K 35/00* (2013.01); *B60K 37/04* (2013.01); *B60H 2001/3471* (2013.01); *B60H 2001/3492* (2013.01); *B60K 2370/152* (2019.05); *B60K 2370/658* (2019.05); *B60K 2370/682* (2019.05); *B60Y 2400/92* (2013.01)

(58) Field of Classification Search
CPC ........ B60H 1/3414; B60H 1/242; B60H 1/34; B60H 2001/3478; B60H 1002/3471; B60K 2370/658; B60K 35/00; B60K 3/07; B60Y 2400/92; B62D 25/142
See application file for complete search history.

(56) References Cited

U.S. PATENT DOCUMENTS

| 4,559,868 | A | 12/1985 | Nonaka et al. |
| 5,752,877 | A | 5/1998 | Sun |
| 6,386,965 | B1 | 5/2002 | Greenwald et al. |

(Continued)

FOREIGN PATENT DOCUMENTS

| CN | 202728114 U | 2/2013 |
| CN | 103917389 B | 10/2016 |

(Continued)

OTHER PUBLICATIONS

Bourgon, FR 2,819,756 A1 English machine translation, Jul. 26, 2002 (Year: 2002).*

(Continued)

*Primary Examiner* — Kenneth J Hansen
*Assistant Examiner* — Phillip Decker
(74) *Attorney, Agent, or Firm* — David Coppiellie; King & Schickli, PLLC (57) ABSTRACT

An integrated display and ventilation assembly includes a display screen and a first air register. The first air register is displaceable between a first stowed position concealed behind the display screen and a first deployed position projecting from behind the display screen. A related method of ventilating a passenger compartment of a motor vehicle is also disclosed.

10 Claims, 8 Drawing Sheets

(56) References Cited

U.S. PATENT DOCUMENTS

| | | | | |
|---|---|---|---|---|
| 6,508,703 | B1* | 1/2003 | Uemura | B60H 1/00692 251/901 |
| 6,612,922 | B2* | 9/2003 | Uemura | B60H 1/00692 454/121 |
| 7,544,123 | B2* | 6/2009 | Krause | B60H 1/3421 454/310 |
| 9,180,751 | B2* | 11/2015 | Han | B60H 1/00692 |
| 9,278,607 | B2* | 3/2016 | Zalan | B60H 1/3421 |
| 9,308,943 | B2* | 4/2016 | Nagai | B60K 37/00 |
| 9,315,090 | B2* | 4/2016 | Wittorf | B60H 1/3421 |
| 9,381,788 | B2* | 7/2016 | Han | B60H 1/00692 |
| 9,764,617 | B2* | 9/2017 | Baker | B60H 1/00842 |
| 9,969,244 | B2* | 5/2018 | Hurd | B60H 1/00821 |
| 10,434,838 | B2* | 10/2019 | Dunham | B60H 1/00871 |
| 2006/0186650 | A1* | 8/2006 | Kuwano | B60H 1/0055 280/732 |
| 2009/0098815 | A1 | 4/2009 | Hotary | |
| 2014/0060795 | A1* | 3/2014 | Yu | B60H 1/00295 165/202 |
| 2014/0131026 | A1* | 5/2014 | Hurd | B60H 1/00821 165/204 |
| 2014/0179213 | A1* | 6/2014 | Moon | B60H 1/34 454/152 |
| 2015/0001870 | A1* | 1/2015 | Parcher | B60R 11/0252 296/1.07 |
| 2016/0300516 | A1* | 10/2016 | Ro | G09G 5/14 |
| 2017/0269771 | A1* | 9/2017 | Nam | B60K 35/00 |
| 2017/0274773 | A1* | 9/2017 | Woodhouse | B60R 16/02 |
| 2017/0291469 | A1* | 10/2017 | Romero Regalado | B60R 16/0373 |
| 2019/0299745 | A1* | 10/2019 | Ocal | B60H 1/00985 |
| 2019/0308488 | A1* | 10/2019 | Nava | B60H 1/242 |
| 2020/0148032 | A1* | 5/2020 | Skapof | B60H 1/00985 |
| 2020/0148033 | A1* | 5/2020 | Skapof | B60H 1/00871 |

FOREIGN PATENT DOCUMENTS

| | | | | |
|---|---|---|---|---|
| DE | 10313325 | A1* | 10/2004 | B60H 1/242 |
| DE | 102005017556 | A1* | 10/2006 | B60K 35/00 |
| DE | 102009060450 | A1* | 6/2011 | B60K 37/06 |
| EP | 2578424 | A1* | 4/2013 | B60H 1/3414 |
| FR | 2819756 | A1* | 7/2002 | B60H 1/3407 |
| FR | 2819756 | A1 | 7/2002 | |
| FR | 2831109 | A1* | 4/2003 | B60H 1/3414 |
| FR | 3028810 | A1* | 5/2016 | B60H 1/3421 |
| JP | 2013154722 | A* | 8/2013 | |
| JP | 2013154852 | A* | 8/2013 | |

OTHER PUBLICATIONS

English Machine Translation of CN103917389B Oct. 19, 2016.
English Machine Translation of CN202728114U Feb. 13, 2013.
English Machine Translation of FR2819756A1 Jul. 26, 2002.

* cited by examiner

INTEGRATED DISPLAY AND VENTILATION ASSEMBLY

TECHNICAL FIELD

This document relates generally to the motor vehicle equipment field and, more particularly, to an integrated display and ventilation assembly as well as to a related method of ventilating a passenger compartment of a motor vehicle.

BACKGROUND

This document relates to a new and improved integrated display and ventilation assembly wherein air registers are integrated into a center stack display at the top of the instrument panel. Advantageously, the air registers may be deployed from behind the display screen to different degrees depending upon the amount of conditioned air required to be provided to the passenger compartment of the motor vehicle in order to maintain a comfort level for the occupants. When not required for cooling, heating or ventilating purposes the air registers may be stowed behind the display screen where they are fully concealed from sight to provide sleek and progressive styling. This enhances the aesthetic appeal for many motor vehicle operators.

SUMMARY

In accordance with the purposes and benefits described herein, an integrated display and ventilation assembly is provided. That integrated display and ventilation assembly comprises a display screen and a first air register displaceable between a first stowed position concealed behind the display screen and a first deployed position projecting from behind the display screen. For purposes of this document, the terminology "display screen" refers to any electronic screen of any type suited for displaying motor vehicle operating or other data or information useful to a driver or other occupant of the motor vehicle.

The first air register may include a first duct shutoff door. Further, a first gear rack may be carried on the first air register.

In addition, the integrated display and ventilation assembly may include a first actuator for driving a first pinion engaged with the first gear rack whereby the first air register is displaced between the first stowed position and the first deployed position.

The integrated display and ventilation assembly may also include a first air duct having a first air distribution outlet. A door guide may be provided on the first duct. The first door guide may receive and guide the first duct shutoff door as the first air register is displaced between the first stowed position and the first deployed position.

The integrated display and ventilation assembly may also include a second air register displaceable between a second stowed position concealed behind the display screen and a second deployed position projecting from behind the display screen. The first air register may project from a first side of the display screen in the first deployed position and the second air register may project from a second side of the display screen in the second deployed position. The first side may be opposite the second side.

The second air register may include a second duct shutoff door. In addition, a second gear rack may be carried on the second air register the integrated display and ventilation assembly may further include a second actuator for driving a second pinion engaged with the second gear rack whereby the second air register is displaced between the second stowed position and the second deployed position.

The integrated display and ventilation assembly may further include a second air duct having a second air distribution outlet. A second door guide on the second duct may receive and guide the second duct shutoff door as the second air register is displaced between the second stowed position and the second deployed position.

In accordance with an additional aspect, a method may be provided of ventilating a passenger compartment of a motor vehicle. That method may comprise the steps of: (a) displacing, by a controller controlled actuator, at least one air register from a stowed position concealed behind the display screen to a deployed position projecting from behind the display screen and (b) delivering air from the at least one air register into the passenger compartment when the at least one register is in the deployed position.

The method may also include the step of opening a duct shutoff door when the at least one air register is displaced from the stowed position to the deployed position so as to allow conditioned air to reach the at least one air register from an HVAC system of the motor vehicle. In addition the method may include the step of displacing, by the controller controlled actuator, the at least one air register to a partially deployed position when airflow requirements are reduced. Still further, the method may include the step of displacing, by the controller controlled actuator, the at least one air register to the stowed position and closing the duct shutoff door when airflow requirements so allow.

In the following description, there are shown and described several preferred embodiments of the integrated display and ventilation assembly as well as to the related method of ventilating a passenger compartment of a motor vehicle. As is should be realized, the integrated display and ventilation assembly and related method are capable of other, different embodiments and their several details are capable of modification in various, obvious aspects all without departing from the integrated display and ventilation assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated display and ventilation assembly and together with the description serve to explain certain principles thereof.

Reference will now be made in detail to the present preferred embodiments of the integrated display and ventilation assembly, examples of which are illustrated in the accompanying drawing figures.

DETAILED DESCRIPTION

Reference is now made to FIGS. 1-5 which illustrate a new and improved integrated display and ventilation assembly 10. In the illustrated embodiment, the integrated display and ventilation assembly 10 is located in the motor vehicle at the top of the instrument panel 12 above the center stack 14 which includes the radio 16.

The integrated display and ventilation assembly 10 includes a display screen 18, such as an electronic display screen, adapted to display motor vehicle operating information and other data useful to the driver of the motor vehicle. Such a display screen 18 may comprise a liquid crystal display, a touchscreen display or any other type of display appropriate for incorporation into a motor vehicle. The display screen 18 may display climate control information, navigation information, apps information, settings information, entertainment information (such as radio, CD player or the like) or motor vehicle operating data or warnings as is known in the art.

Figure 1:
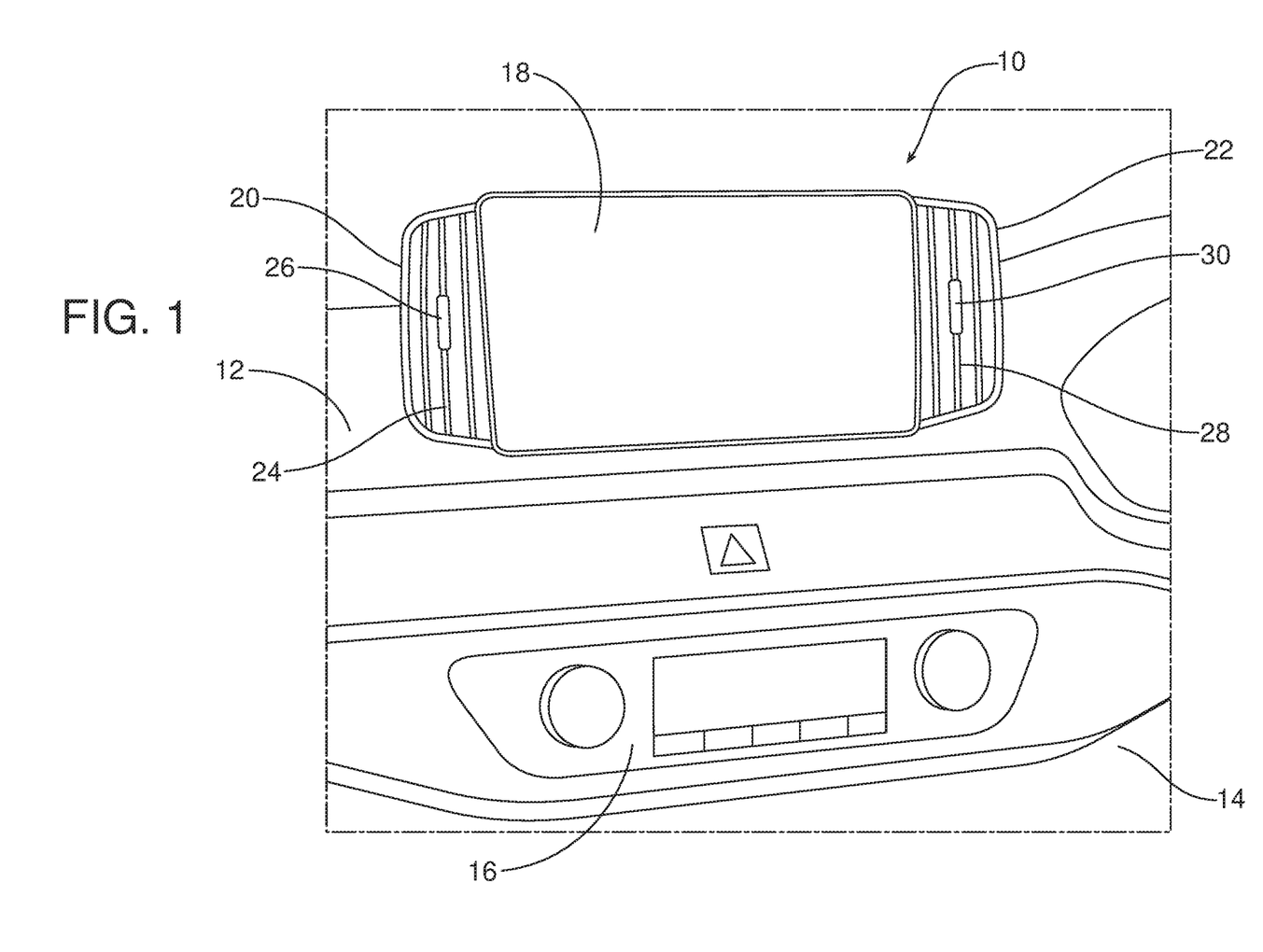
FIG. 1 is a detailed perspective view of the integrated display and ventilation assembly at the top of the instrument panel located above the center stack of a motor vehicle wherein the air registers of that assembly are illustrated in a fully deployed position.
Figure 2:
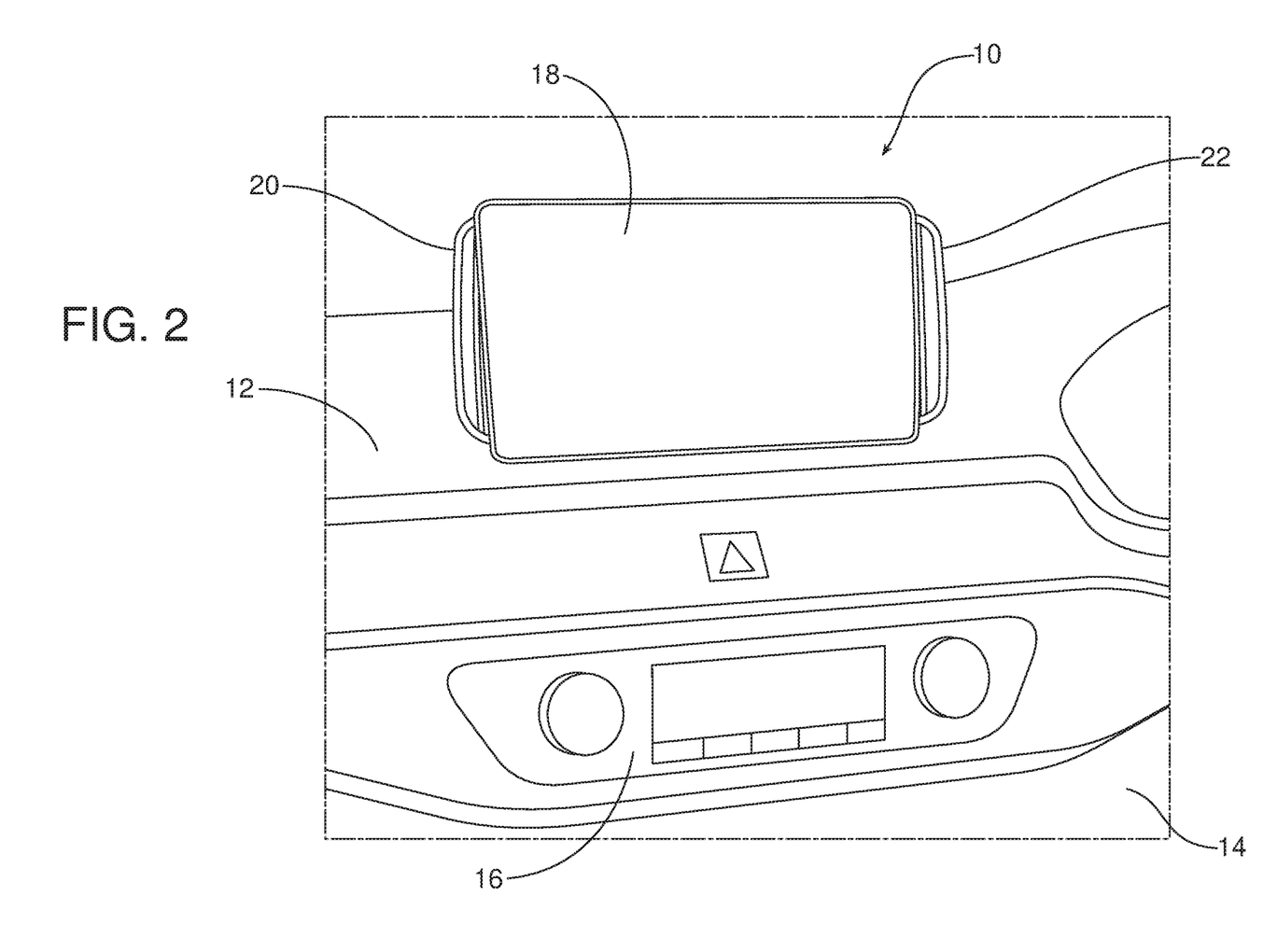
FIG. 2 is a view similar to FIG. 1 but illustrating the air registers in a partially deployed position.
Figure 3:
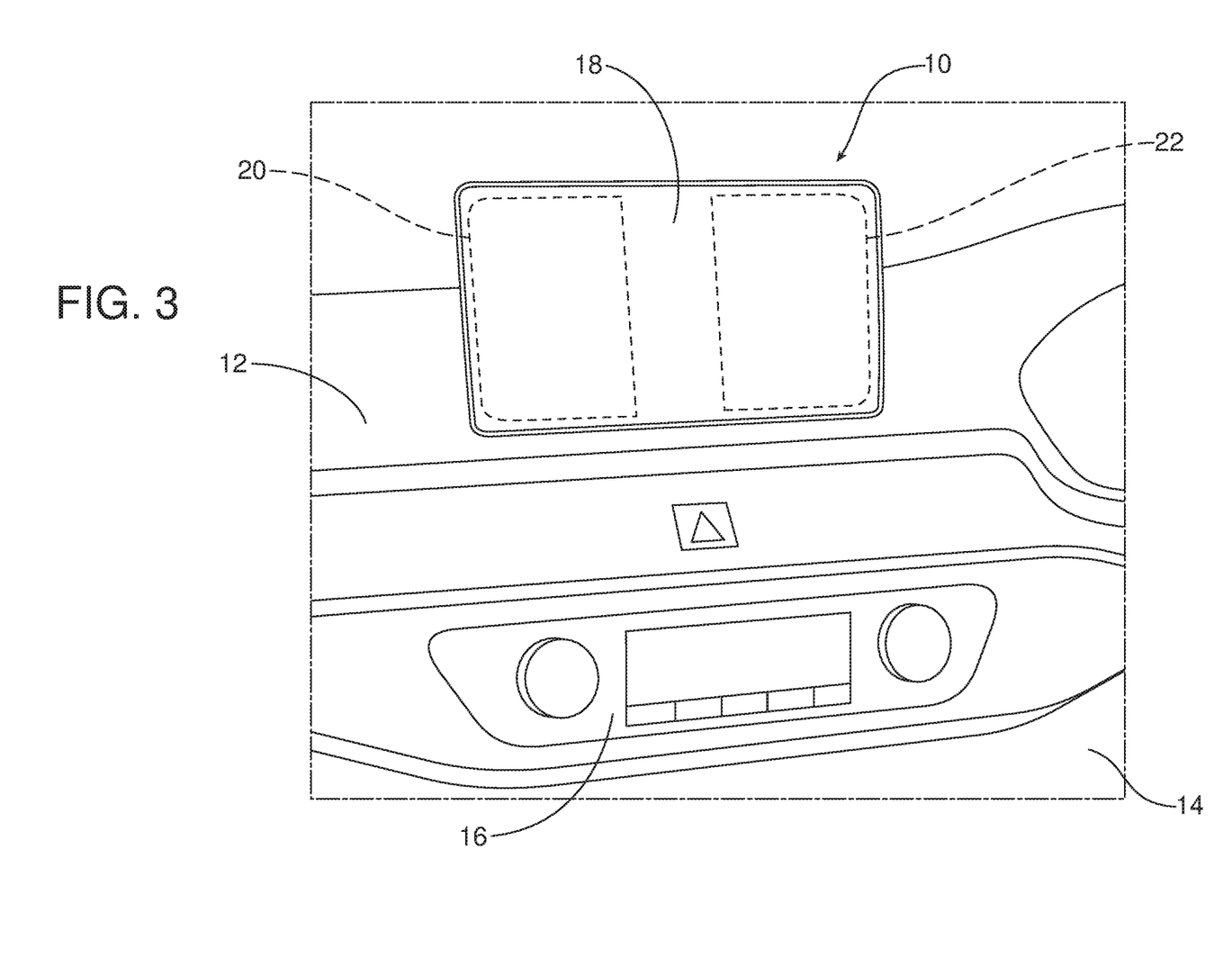
FIG. 3 is a view similar to FIGS. 1 and 2 illustrating the air registers hidden behind the display screen when the air registers are in the stowed position.

The integrated display and ventilation assembly 10 also includes a first air register 20 and a second air register 22. The first air register 20 is displaceable between a first stowed position wherein the first air register is concealed behind the display screen 18 as illustrated in FIG. 3 through a first partially deployed or intermediate position wherein the first air register 20 is partially projected from behind the display screen as illustrated in FIG. 2 to a first deployed position wherein the air register fully projects from behind the display screen as illustrated in FIG. 1. Similarly, the second air register 22 is selectively displaceable between a second stowed position wherein the second air register is fully concealed behind the display screen 18 as illustrated in FIG. 3, through a second partially deployed position wherein the second air screen projects slightly from behind the display screen as illustrated in FIG. 2 to a second deployed position wherein the second air register is fully deployed from behind the display screen as illustrated in FIG. 1. In the illustrated embodiment, the first air register 20 is deployed from a first side of the display screen 18 while the second air register 22 is deployed from a second side of the display screen opposite the first side.

As illustrated in the drawing figures, the first air register includes a first set of adjustable vanes 24 that may be engaged at the tab 26 to adjust the flow of air discharged from the first air register. Similarly, the second air register 22 may include a second set of adjustable vanes 28 that may be adjusted using the second tab 30 to control the direction of air discharged from the second air register. As illustrated schematically in FIGS. 4a-4c and 5, the first air register 20 includes a first duct shutoff door 32. In addition, a first gear rack 34 is carried on the first air register 20. Similarly, the second air register 22 includes a second duct shutoff door 36. A second gear rack 38 is carried on the second air register 22.

Figure 5:
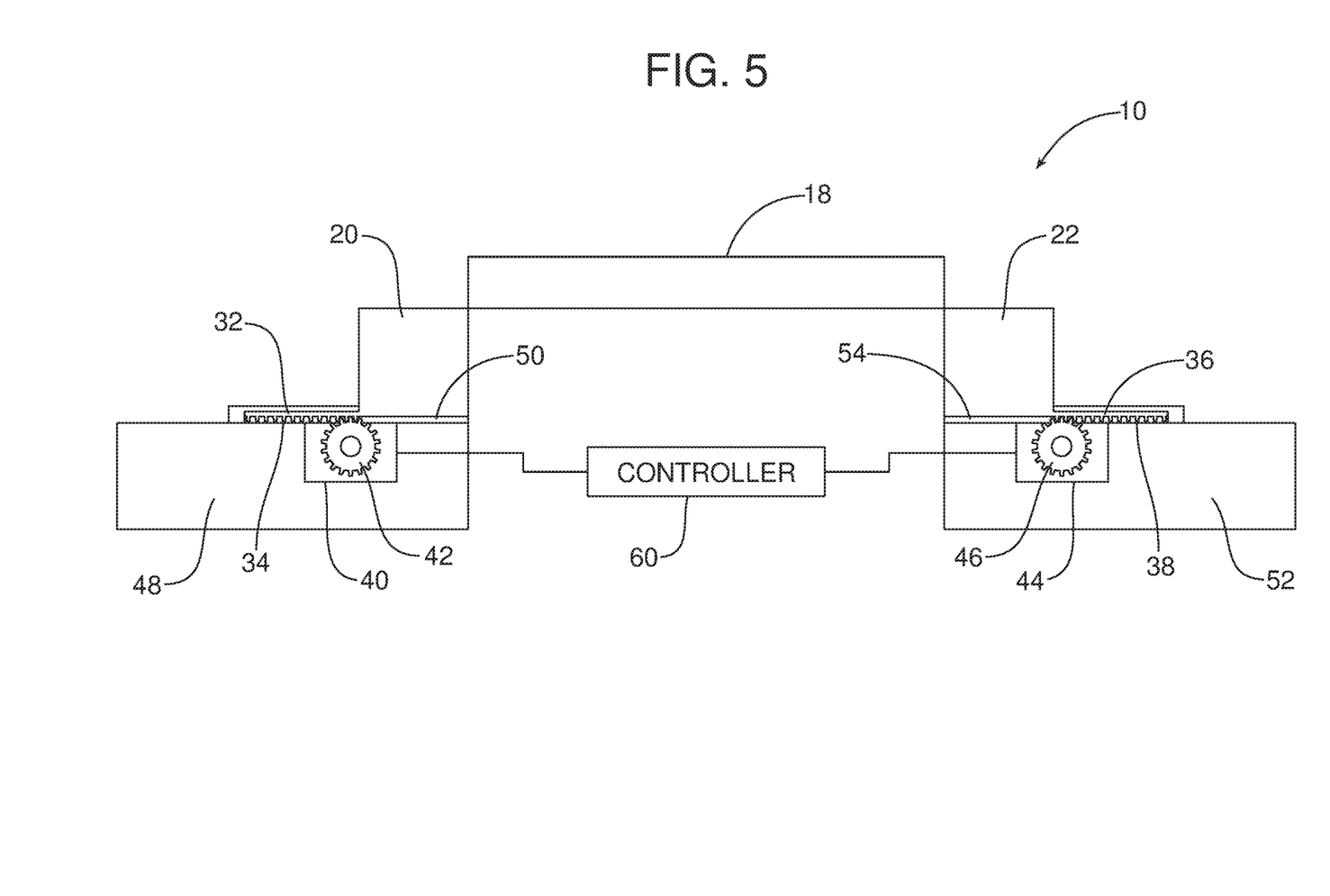
FIG. 5 is a schematic illustration of the one possible mechanism to be utilized to displace the air registers between the fully deployed, partially deployed and stowed positions.

As best illustrated in FIG. 5, the integrated display and ventilation assembly 10 also includes a first actuator 40 that may be fixed behind the face of the instrument panel 12 so as to be concealed from view. The first actuator 40 drives a first pinion 42 that engages with the first gear rack 34 on the first air register 20 whereby the first air register may be displaced between the first stowed position illustrated in FIG. 3 to the first partially deployed position illustrated in FIG. 2 to the first fully deployed position illustrated in FIG. 1 and back again.

The integrated display and ventilation assembly 10 also includes a second actuator 44 that may be fixed behind the face of the instrument panel like the first actuator 40. The second actuator 44 drives a second pinion 46 that engages the second gear rack 38 on the second air register 22 whereby the second air register may be selectively displaced between the second stowed position illustrated in FIG. 3, through the second partially deployed position illustrated in FIG. 2 to the second fully deployed position illustrated in FIG. 1 and back again.

Figure 4A:
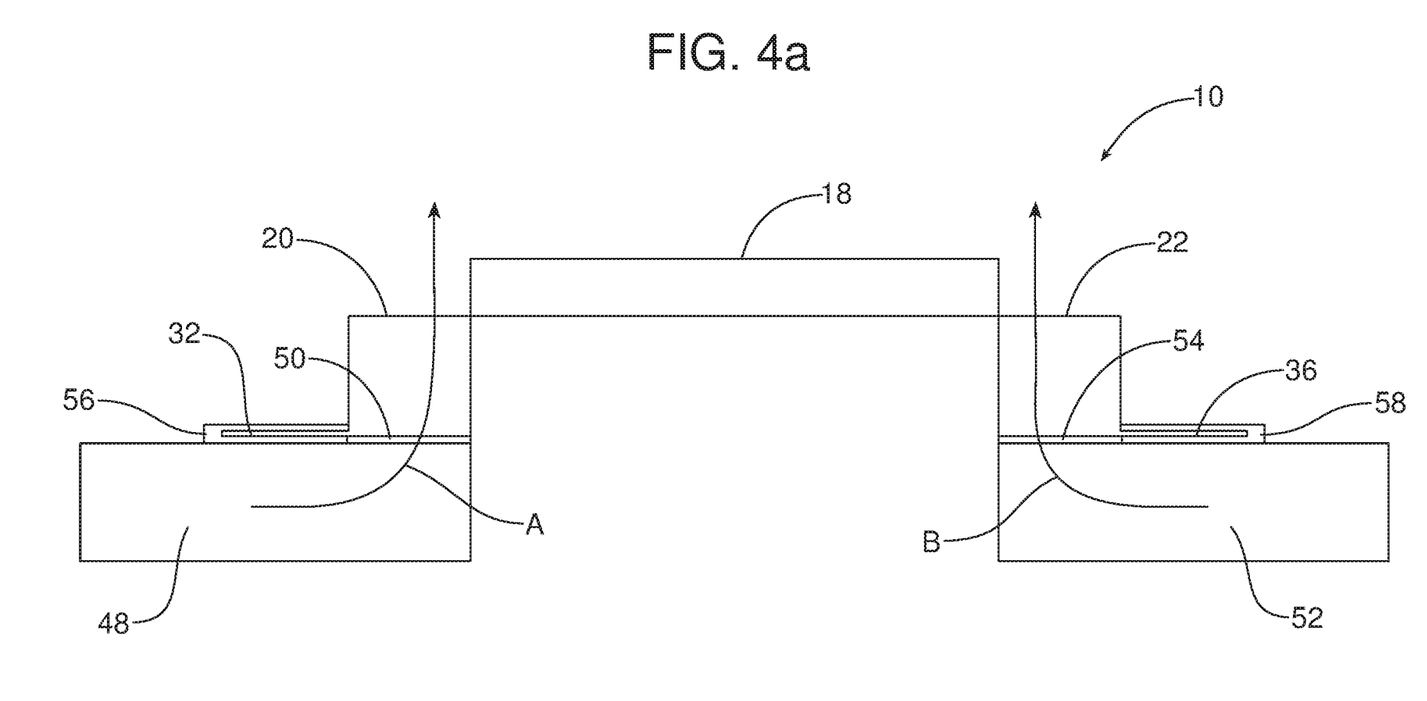
FIGS. 4a-4c are schematic illustrations showing operation of the duct shutoff doors when the air registers are in the respective fully deployed position, partially deployed position and stowed position.
Figure 4B:
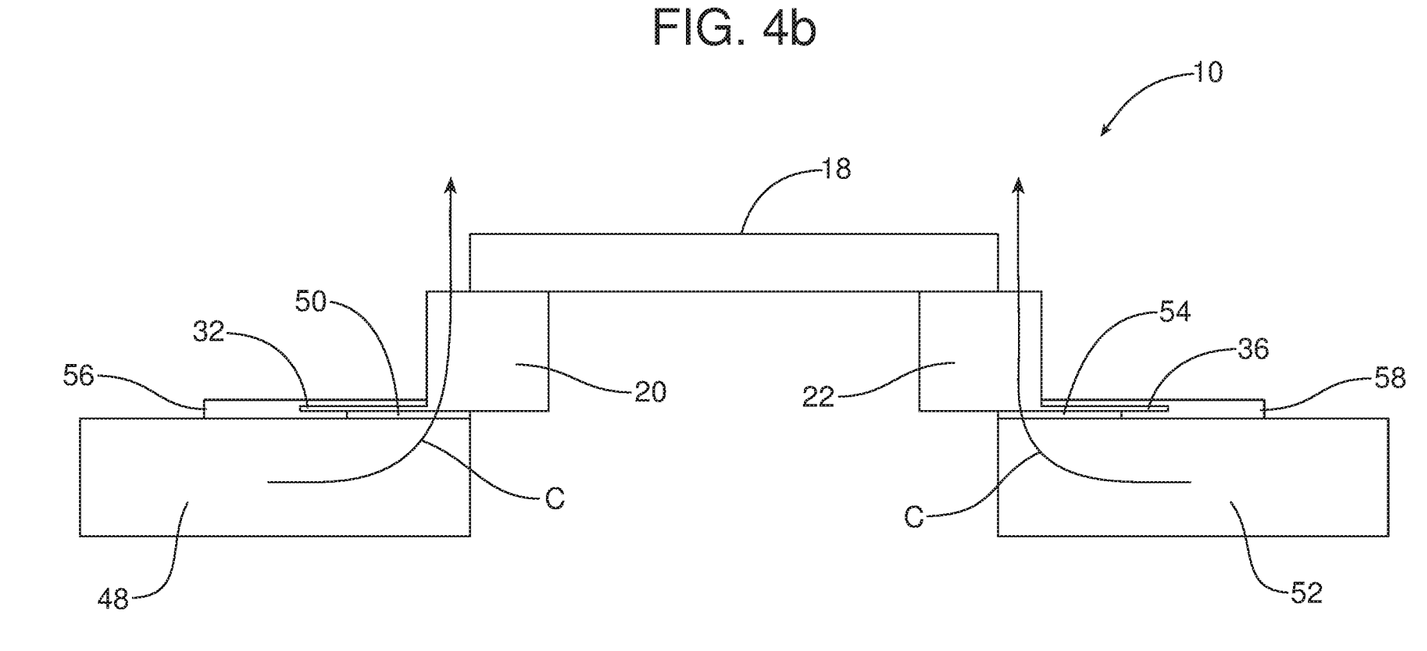
Figure 4C:
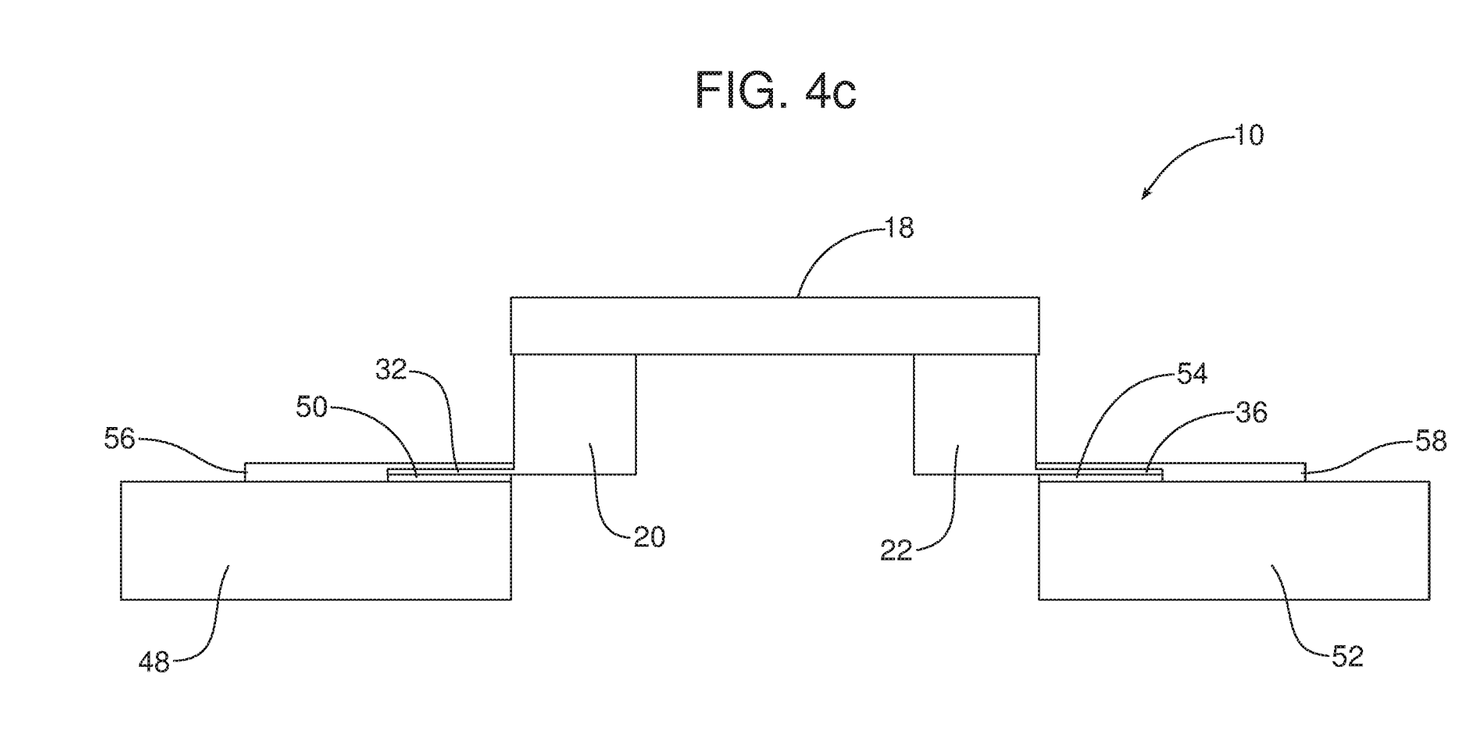

As best illustrated in FIG. 4, the integrated display and ventilation assembly 10 also includes a first air duct 48 having a first air distribution outlet 50 and a second air duct 52 having a second air distribution outlet 54. A first door guide 56 is provided on the first air duct 48. The first door guide 56 receives and guides the first duct shutoff door 32 as the first air register 20 is displaced between the first stowed, partially deployed and deployed positions illustrated in FIGS. 1-3. Similarly, a second door guide 58 is provided on the second air duct 52. The second door guide 58 receives and guides the second duct shutoff door 36 as the second register is displaced between the second stowed, partially deployed and deployed positions illustrated in FIGS. 1-3.

As should be appreciated from reviewing FIG. 4a, when the first and second air registers 20, 22 are in the fully deployed position illustrated in FIG. 1, the first air distribution outlet 50 is fully opened to allow the passage of conditioned air (note action arrow A) from the first air duct 48 through the overlying first air register 20 and first set of vanes 24 into the passenger compartment of the motor vehicle while the second air distribution outlet 54 is fully opened to allow the passage of conditioned air (note action arrow B) from the second air duct 52 through the overlying second air register 22 and second set of vanes 28 into the passenger compartment of the motor vehicle. In contrast, as illustrated in FIG. 4c, when the first and second air registers 20, 22 are in the stowed position, the first duct shutoff door 32 overlies and seals the first air distribution outlet 50 and the first air duct 48 and the second duct shutoff door 36 overlies and seals the second air distribution outlet 54 and the second air duct 52 thereby preventing any passage of conditioned air through the first and second air registers when those air registers are concealed behind the display screen 18.

When the first and second air registers 20, 22 are partially deployed as illustrated in FIG. 2, the first air distribution outlet 50 is partially opened by the first duct shutoff door 32 and the second air distribution outlet 54 is partially opened by the second duct shutoff door 36 to allow the passage of some air (note action arrows C) from the first air ducts 48, 52 through the respective first and second air registers 20, 22.

As should be appreciated, when a large volume of air must be circulated by the climate control system of the motor vehicle though the passenger cabin, the first and second air registers 20, 22 may be placed in the fully deployed position illustrated in FIG. 1 to allow for maximum air flow. In contrast, once a comfortable passenger cabin temperature has been established and a lower volume of air flow is required to maintain that comfortable temperature, the first and second air registers 20, 22 may be moved toward the stowed position into a partially deployed position such as illustrated in FIG. 2 thereby allowing reduced air flow. However, when no air flow through the first and second registers 20, 22 is required by the climate control system it should be appreciated that the first and second registers 20, 22 may be fully stowed behind the display screen 18 as illustrated in FIG. 1 with all air flow from the first air ducts 48, 52 to the first and second air registers 20, 22 cut off by the first and second duct shutoff doors 32, 36.

As should be appreciated and as shown in FIG. 5, a controller 60 may be provided to control the actuators 40, 44 and the displacement of first and second air registers 20, 22 between the various operating positions illustrated in FIGS. 1-3. That controller 60 may comprise a dedicated microprocessor or an electronic control unit (ECU) operating in accordance with appropriate instructions from control software. Such a controller 60 may comprise one or more processors, one or more memories, and one or more network interfaces all in communication with each other over a communication bus.

Consistent with the above description, a new and improved method is provided of ventilating a passenger compartment of a motor vehicle. That method comprises the steps of displacing, by a controller, controlled actuator 40 or 44 at least one air register 20 or 22 from a stowed position concealed behind the display screen 18 as illustrated in FIG. 3 to a deployed position projecting from behind the display screen as illustrated in FIG. 1 and delivering air from the at least one air register into the passenger compartment when the at least one air register is in the deployed position.

The method may further include the step of opening a duct shutoff door 32 or 36 when the at least one air register 20, 22 is displaced from the stowed position to the deployed position so as to allow conditioned air to reach the at least one air register from the HVAC system or climate control system of the motor vehicle.

Still further, the method may include the step of displacing, by the controller controlled actuator 40 or 44, the at least one air register 20 or 22 to a partially deployed position when air flow requirements are reduced. Still further, the method may include the step of displacing, by the controller controlled actuator 40, 44, at least one air register 20 or 22 to the stowed position and closing the duct shutoff door 32, 36 to seal the first or second air distribution outlets 50, 54 of the first or second air duct 48, 52.

Figure 6:
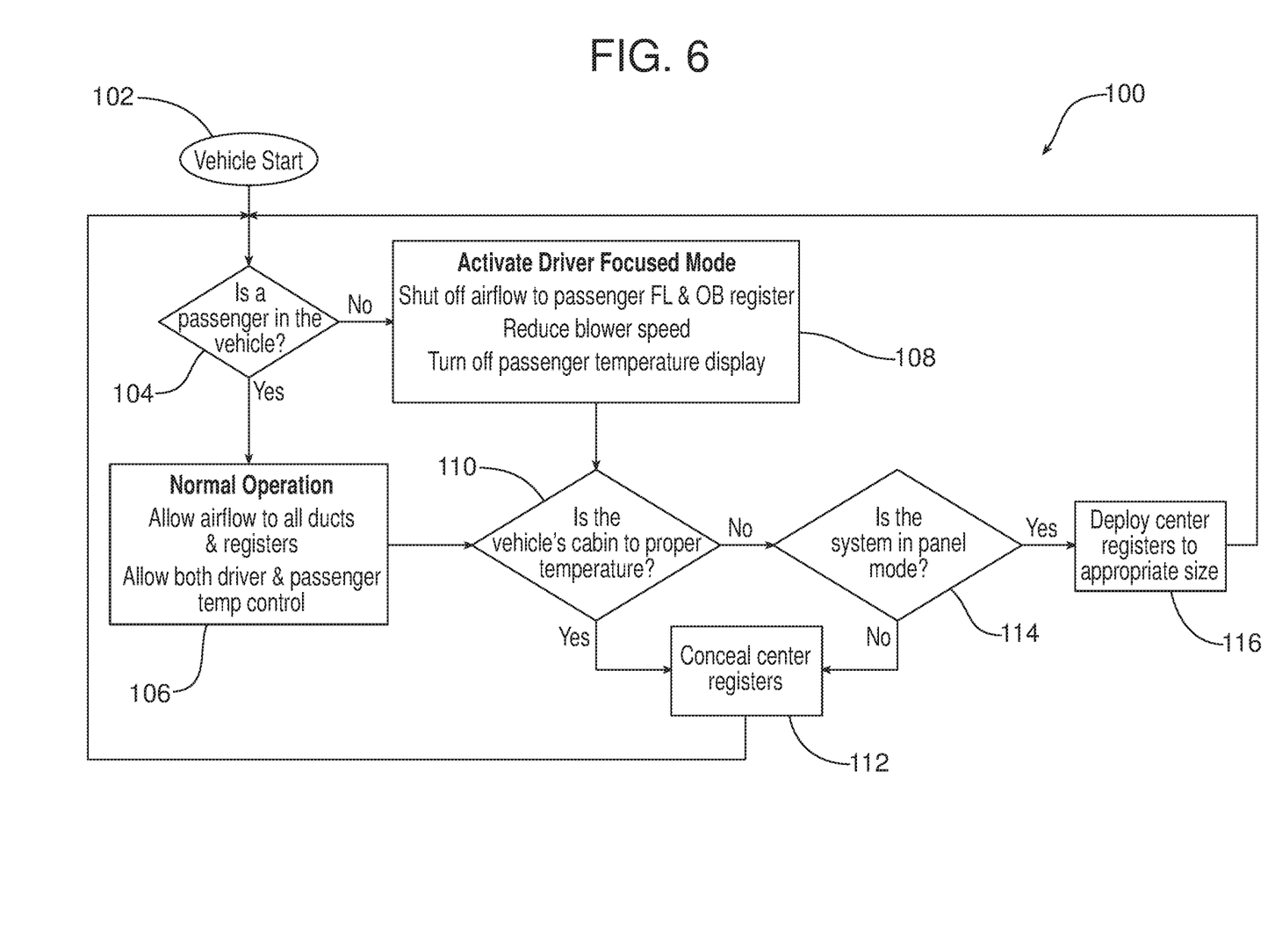
FIG. 6 is one possible embodiment of control logic flow diagram for the integrated display and ventilation assembly illustrated in FIGS. 1-5.

Reference is now made to FIG. 6 illustrating one possible control logic flow diagram 100 for the new and improved integrated display and ventilation assembly 10. That control logic flow diagram 100 is self-explanatory. After a vehicle start at box 102, the controller 60 queries whether or not a passenger is in the passenger seat of the motor vehicle at box 104. If yes, normal operation of the HVAC system or climate control system is initiated with air flow allowed to all ducts and registers and both driver and passenger are provided with temperature control capability through, for example, touchscreen capability provided by the display screen 18. See box 106. In contrast, if there is no front seat passenger, the controller 60 activates "driver focused mode," shutting off air flow to the passenger side floor and outboard registers, reducing blower speed and turning off the passenger temperature display controls. See box 108. Next, the controller 60 queries whether the vehicle cabin is at the proper temperature at box 110. If yes, the controller 60 conceals the first and second air registers 20, 22 behind the display screen 18 as illustrated in FIG. 3 by providing appropriate control signals to the first and second actuators 40, 44. See box 112.

In contrast, if the vehicle cabin is not at the proper or desired temperature, the controller 60 queries whether or not the HVAC system or climate control system is in "panel mode" at box 114. If no, the controller 60 conceals the center registers 20, 22 as indicated at box 112. If yes, the controller 60 deploys the first and second registers 20, 22 to an appropriate size to provide the necessary air flow to maintain comfort of the occupants of the passenger compartment. See box 116. After the controller 60 either conceals the first and second registers 20, 22 at box 112 or deploys the registers to appropriate size at box 116, the system maintains that unless the status of the front passenger changes at box 104.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An integrated display and ventilation assembly, comprising:
a display screen;
a first air duct having a first air distribution outlet;
a first air register including a first set of vanes and a first shut off door offset from said first set of vanes wherein said first air register is displaceable between a first stowed position concealed behind said display screen with said first shut off door overlying said first air distribution outlet and a first deployed position projecting from behind said display screen with said first set of vanes overlying said first air distribution outlet;
a first gear rack carried on said first air register;
a first actuator driving a first pinion engaged with said first gear rack whereby said first air register is displaced between said first stowed position and said first deployed position; and
a first door guide on said first air duct, said first door guide receiving and guiding said first duct shutoff door as said first air register is displaced between said first stowed position and said first deployed position.

2. The integrated display and ventilation assembly of claim 1, further including a second air register displaceable between a second stowed position concealed behind said display screen and a second deployed position projecting from behind said display screen.

3. The integrated display and ventilation assembly of claim 2, wherein said first air register projects from a first side of said display screen in said first deployed position and said second air register projects from a second side of said display screen in said second deployed position wherein said first side is opposite said second side.

4. The integrated display and ventilation assembly of claim 3, wherein said second air register includes a second duct shutoff door.

5. The integrated display and ventilation assembly of claim 4, further including a second gear rack carried on said second air register.

6. The integrated display and ventilation assembly of claim 5, further including a second actuator driving a second pinion engaged with said second gear rack whereby said second air register is displaced between said second stowed position and said second deployed position.

7. The integrated display and ventilation assembly of claim 6, further including a second air duct having a second air distribution outlet.

8. The integrated display and ventilation assembly of claim 7, further including a second door guide on said second air duct, said second door guide receiving and guiding said second duct shutoff door as said second air register is displaced between said second stowed position and said second deployed position.

9. The integrated display and ventilation assembly of claim 8, further including a controller adapted to control operation of said first actuator and said second actuator and thereby selectively displace said first air register and said second air register.

10. The integrated display and ventilation assembly of claim 6, further including a controller adapted to control operation of said first actuator and said second actuator and thereby selectively displace said first air register and said second air register.

\* \* \* \* \*